United States Patent [19]

Ryan

[11] Patent Number: 4,803,439
[45] Date of Patent: Feb. 7, 1989

[54] GLASS BEAD LASER AMPLIFIER WITH PHASE CONJUGATE MIRROR

[75] Inventor: Robert E. Ryan, Levittown, N.Y.
[73] Assignee: Grumman Aerospace Corportion, Bethpage, N.Y.
[21] Appl. No.: 94,116
[22] Filed: Sep. 8, 1987
[51] Int. Cl.⁴ .............................................. H01S 3/02
[52] U.S. Cl. ........................................ 330/4.3; 372/35
[58] Field of Search ............................ 372/35; 330/4.3

[56] References Cited

U.S. PATENT DOCUMENTS

| | | | |
|---|---|---|---|
| 3,602,036 | 8/1971 | Young | 330/4.3 |
| 3,611,190 | 10/1971 | Keefe, Jr. | 372/35 |
| 3,621,456 | 11/1971 | Young | 372/35 X |
| 3,626,318 | 12/1971 | Young | 372/35 X |
| 3,626,319 | 12/1971 | Young | 372/35 X |
| 3,628,179 | 12/1971 | Cuff | 372/35 |
| 3,735,282 | 5/1973 | Gans | 330/4.3 |
| 3,851,267 | 11/1974 | Tanner | 372/35 X |
| 4,228,406 | 10/1980 | Lewis et al. | 372/35 X |
| 4,233,571 | 11/1980 | Wang et al. | 330/4.3 |

*Primary Examiner*—Thomas H. Tarcza
*Assistant Examiner*—Mark Hellner
*Attorney, Agent, or Firm*—Scully, Scott Murphy & Presser

[57] ABSTRACT

A glass bead laser amplifier which is designed to operate efficiently at relatively high optical power outputs, and which is designed to be easily manufactured and scaled up in size to produce high power laser beams. The laser amplifier cavity if filled with doped glass lasing beads or elements which are packed therein to be in contiguous contact with each other. The shape of each glass element preferably provides a relatively large ratio of the external area to volume of the glass lasing element, to provide for efficient cooling thereof. A cooling system is provided for the laser amplifier cavity in which a coolant fluid circulates through the laser cavity around and between the contiguous glass lasing elements for cooling thereof. The cooling fluid is selected to have an index of refraction substantially matching that of the glass lasing elements to substantially reduce scattering of light passing through the glass/cooling fluid interfaces in the laser amplifier cavity. Moreover, a conjugate mirror is placed adjacent to one end of the laser amplifier cavity for reflecting the laser light which has passed once through the laser amplifier cavity back therethrough, to cancel the initial optical distortions introduced into the light beam as it initially passed through the laser amplifier cavity and the glass/cooling fluid interfaces therein. This results in the production of an output laser beam substantially unaffected by optical distortions which would otherwise be introduced by the laser amplifier.

9 Claims, 3 Drawing Sheets

GLASS BEAD LASER AMPLIFIER WITH PHASE CONJUGATE MIRROR

BACKGROUND OF THE INVENTION

1. Field of the Invention

The present invention relates generally to glass laser amplifier structures, and more particularly pertains to a glass bead laser amplifier with a phase conjugate mirror which is designed to operate at relatively high optical powers. The glass bead laser amplifier of the subject invention is designed to be easily manufactured and also to be scaled up in size to provide a relatively high optical power output.

2. Discussion of the Prior Art

The present invention is directed to high power glass laser amplifier structures. The repetition rates for high power pulsed glass laser amplifiers of the prior art are generally limited by the low heat dissipation rates of the glass laser materials during and following each laser pulse. This heat dissipation problem has essentially limited laser operations at reasonably high power levels. The removal of that portion of the pumping energy which is normally converted to heat in the glass laser material is a paramount problem in maintaining efficient operation of such high power glass laser devices. Liquid laser systems have been suggested as one approach in the prior art to overcoming the operational limitations imposed by such heat dissipation problems. However, while ameliorating the heat dissipation problems, the temperature gradients within the liquid laser medium produce refractive index gradients which grossly influence the optical quality of the laser cavity. Therefore a liquid laser amplifier system, while somewhat obviating the heat dissipation problems, introduces other more complex problems, and has not provided an acceptable approach for increasing the average operational power of such laser amplifier devices.

The present invention is directed to a high power glass bead laser amplifier which has excellent optical qualities and mechanical stability, while providing for adequate heat dissipation in a type of construction which is easily manufactured and scaled up in size to provide for a relatively high optical power output.

Glass lasers, particularly Nd glass lasers, are playing an increasingly important role in science and industry, both militarily and commercially. They are used in laser fusion, combustion and flow field diagnostics, medicine, nonlinear optics, cutting, welding and other technological areas where high peak powers and large pulse energies are required. Glass lasers are generally very scalable, that is they can be made relatively large because glass can be easily doped, polished, and made in sufficient quantities with good energy density storage for laser amplifiers.

Although glass lasers are scalable, the time average power of the laser will not scale indefinitely. This is due primarily to the time necessary to cool the glass rods or slabs of the amplifier. Glass, being a poor conductor of heat, prevents a rapid heat dissipation. Accordingly it is important to cool the glass during operation to prevent index of refraction gradients caused by temperature inhomogeneities. These gradients suppress lasing, increase the chance of laser damage due to focusing effects of the gradients, and cause poor laser beam quality. The cooling time also limits the duty cycle, thus decreasing the actual possible average power output of the glass laser.

Segmented doped glass lasers with cooling are well known in the art, as exemplified by Gudmundsen U.S. Pat. No. 3,487,330, Young U.S. Pat. No. 3,602,836, Cuff U.S. Pat. No. 3,628,179, Young 3,675,152, and Gans U.S. Pat. No. 3,735,282. Generally, these doped regular array of similarly shaped and aligned glass elements therein, such as a stacked disk design, and coolant is circulated around the regular array of glass elements to provide cooling therefor.

Moreover, the use of a phase conjugator reflector in association with a laser cavity to eliminate optical distortions introduced into a laser beam is also well known, as indicated by "APPLICATIONS OF OPTICAL PHASE CONJUCTION" Scientific American, January, 1986, and also by Pohl U.S. Pat. No. 3,617,927, Bret U.S. Pat. No. 3,999,144, Wang U.S. Pat. No. 4,005,935, Wang et al. U.S. Pat. No. 4,233,571 and Evtuhov U.S. Pat. No. 4,321,550.

The present inventing distinguishes from all of the above cited prior art by recognizing that a phase conjugator reflector can be used with a glass laser in such a manner as to make the fabrication and assembly of the glass laser relatively simple and economical, and also to allow the glass laser to be easily scaled up in size to provide relatively high optical power output beams.

SUMMARY OF THE INVENTION

Accordingly, it is a primary object of the present invention to provide a glass laser which is designed to operate efficiently at relatively high optical power levels.

A further object of the subject invention is the provision of a glass laser as described which can be easily manufactured and scaled up in size to provide high optical power output levels.

In accordance with the teachings herein, the present invention provides a laser amplifier with a laser cavity packed with a plurality of doped glass lasing elements or beads in contiguous contact with each other. The shape of each glass element or bead preferably provides a relatively large ratio of the external area to volume of the glass lasing element, to provide for efficient cooling thereof. A cooling system is provided for the laser amplifier cavity in which a cooling fluid is circulated through the laser cavity around and between the contiguous glass lasing elements for cooling thereof. The cooling fluid is selected to have an index of refraction substantially matching that of the glass lasing elements to substantially reduce scattering of light passing through glass/cooling fluid interfaces in the laser amplifier cavity. Moreover, a conjugate mirror is placed adjacent to one end of the laser amplifier cavity for refelecting the light passing through the laser amplifier cavity back therethrough, to cancel the initial optical distortions introduced into the laser beam as it initially passed through the laser amplifier cavity and the glass/cooling fluid interfaces therein. This results in the generation of an output laser beam which is substantially unaffected by optical distortions which would otherwise be introduced by the laser amplifier cavity.

In a preferred embodiment, the doped glass lasing elements are relatively small to provide for efficient cooling thereof, and are of irregular sizes and shapes packed contiguously in to the gas laser amplifier cavity. This construction eliminates the requirement that each glass bead or element be of a given shape and size, as is common in prior art constructions, and accordingly significantly relaxes the constructional and fabricational requirements therefor. This significantly reduces the cost and time of fabrication of the resultant laser amplifier. In greater detail, the glass lasing elements are preferably relatively small with approximately 1 millimeter cube volumes or smaller and are of varying sizes and shapes. This facilitates the packing of the glass lasing elements contiguously into the laser amplifier cavity to substantially fill the entire laser amplifier cavity.

In a second preferred embodiment, the glass lasing elements have a substantially spherical external shape, to maximize the ratio of the external area to the volume of each element.

The teachings of the present invention are particularly applicable to glass lasers wherein the doped glass lasing elements are doped with Neodymium to lase at a wavelength of approximately 1.06 microns in the near infrared portion of the spectrum.

BRIEF DESCRIPTION OF THE DRAWINGS

The foregoing objects and advantages of the present invention for a glass bead laser amplifier with a phase conjugate mirror may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
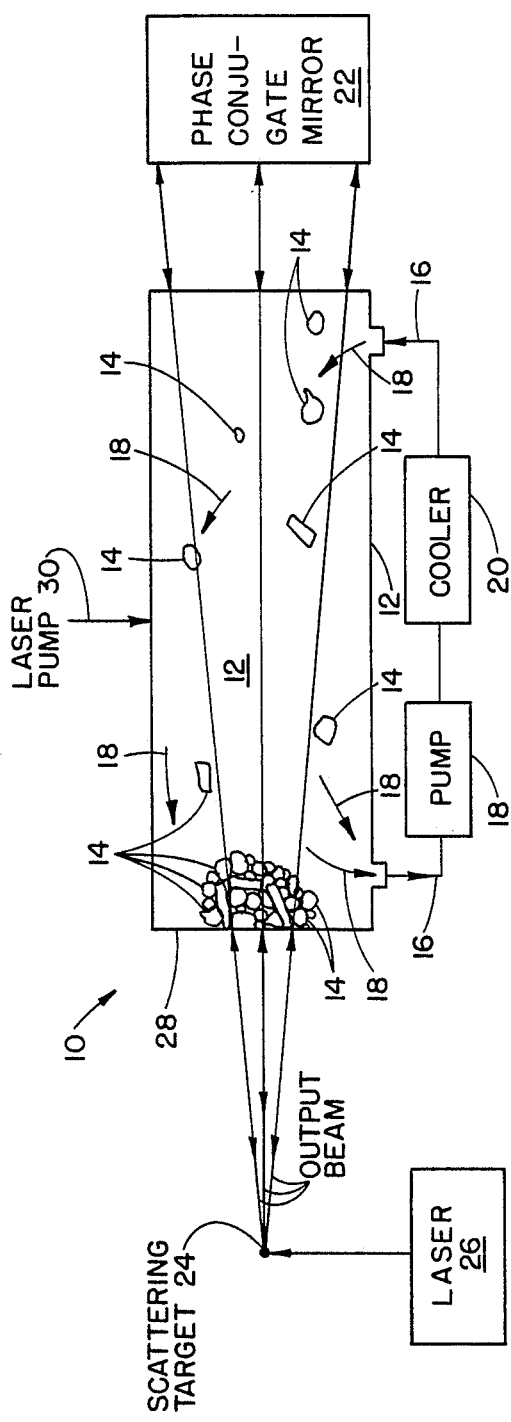
FIG. 1 is a schematic drawing of a first embodiment of a glass bead laser amplifier constructed pursuant to the teachings of the present invention.

Referring to the drawings in detail, FIG. 1 illustrates a first exemplary embodiment 10 of a glass laser amplifier which is particularly preferred for its ease of fabrication and its ability to be scaled up to produce high power laser beams.

The laser amplifier includes a laser amplifier cavity 12 having a plurality of adjacent contiguous doped glass lasing elements or beads 14 therein in contiguous contact with each other. The shape of each glass bead 14 preferably provides a relatively large ratio of the external area to volume of the glass lasing element, to provide for efficient cooling thereof. The glass elements 14 are designated as beads, and the exact shape of each bead 14 is not important, except that they should be relatively small and have a large ratio of external area to volume to provide for efficient cooling thereof. However, the optical quality of the glass beads is significant, and each glass bead should be optically homogeneous.

As in known in the glass laser arts, in a doped glass lasing element, it is the doping material, e.g. Neodymuim, which is actually the lasing medium, and the glass functions mainly as a matrix. In one preferred embodiment the glass lasing elements are relatively small with approximately 1 millimeter cube volumes, and are of varying sizes and shapes. This facilitates the packing of the glass lasing elements contiguously into the laser amplifier cavity to substantially fill the entire laser amplifier cavity with glass lasing elements. FIG. 1 illustrates the glass lasing beads in a packed and contiguous contact only on the left side of the laser cavity for purposes of clarity of illustration, but in actuality they would be tightly packed in contiguous contact throughout the entire laser amplifier cavity 12.

As is known in this art, the optical power output of the laser amplifier is related to the quantity of glass lasing elements in the laser amplifier cavity, and therefore, for high power operation, it is advantageous to fill the entire laser cavity with glass beads 14.

In the design of different laser amplifier cavities, the volume of the cavity can be scaled up or down to fit the particular application, and the structure and concepts of the present invention are particularly applicable to such scaling.

The glass lasing bead elements 14 are preferably round to maximize cooling thereof, but are not necessarily so, as indicated by the various shapes in FIG. 1. This construction eliminates the requirement that each glass bead or element be of a given shape and size, as is common in prior art constructions, and accordingly significantly relaxes the constructional and fabricational requirements therefor. This significantly reduces the costs and time of fabrication of the resultant laser amplifier.

A cooling system is provided for the laser amplifier cavity 12 in which a coolant fluid 16 is circulated through the laser cavity around and between the contiguous glass lasing elements 14 for cooling thereof, as indicated by the arrows 18. A pump 20 and heat exchanger cooler 20 are provided for circulation and cooling of the coolant 16. The coolant fluid is selected to have an index of refraction matching that of the glass lasing elements to substantially reduce scattering of laser light passing through glass/cooling fluid interfaces in the laser amplifier cavity. However, some scattering is still produced at the interfaces and also by thermal gradients in the cooling fluid 16, all of which result in the introduction of optical distortions in the laser beam as it initially passes through the laser amplifier cavity.

However, such optical distortions are compensated for by a phase conjugate mirror 22 which is placed adjacent to one end of the laser amplifier cavity for reflecting the laser light which has passed once through the laser amplifier cavity back therethrough, to cancel the initial optical distortions introduced into the laser beam as it initially passed through the laser amplifier cavity and the glass/cooling fluid interfaces therein. This results in the generation of an output laser beam substantially unaffected by optical distortions which would otherwise be introduced by the laser amplifier. In operation, a distorted beam after striking a phase conjugate mirror is transformed, such that after it propagates back through the medium that initially caused the distortions, the optical beam quality is restored.

The theory for such conjugate mirror operation is discussed in "APPLICATIONS OF OPTICAL PHASE CONJUGATION", cited hereinabove, and the phase conjugate mirror 22 could utilize Brillouin scattering as discussed therein, for instance.

In operation of the laser amplifier of FIG. 1, a target 24 is illuminated by a laser beam from a source laser 26, and the target scatters radiation, some of which is scattered into the laser amplifier cavity through an input window 28 to the laser amplifier cavity through an input window 28 therefor. In embodiments of the present invention utilizing polarized light, the input window 28 could be placed at the Brewster angle.

The target 24 can take many forms in different embodiments, and could be a Deuterium pellet, or could be a remote target such as a tank, or in medical applications a local target such a tumor, etc.

The scattered radiation entering the laser amplifier cavity through the input window 28 is amplified therein in a typical laser amplifier operation. The laser pump 30 could be flashlamps or another laser. As the scattered radiation is amplified, it becomes optically distorted by the amplifying medium. The beam quality is subsequently restored after the light is reflected by the phase conjugate mirror 22 and returns through the amplifier to the target 24. The laser amplifier is cooled by circulating the index matching coolant fluid 16 around the individual glass beads in the laser amplifier cavity.

Figure 2:
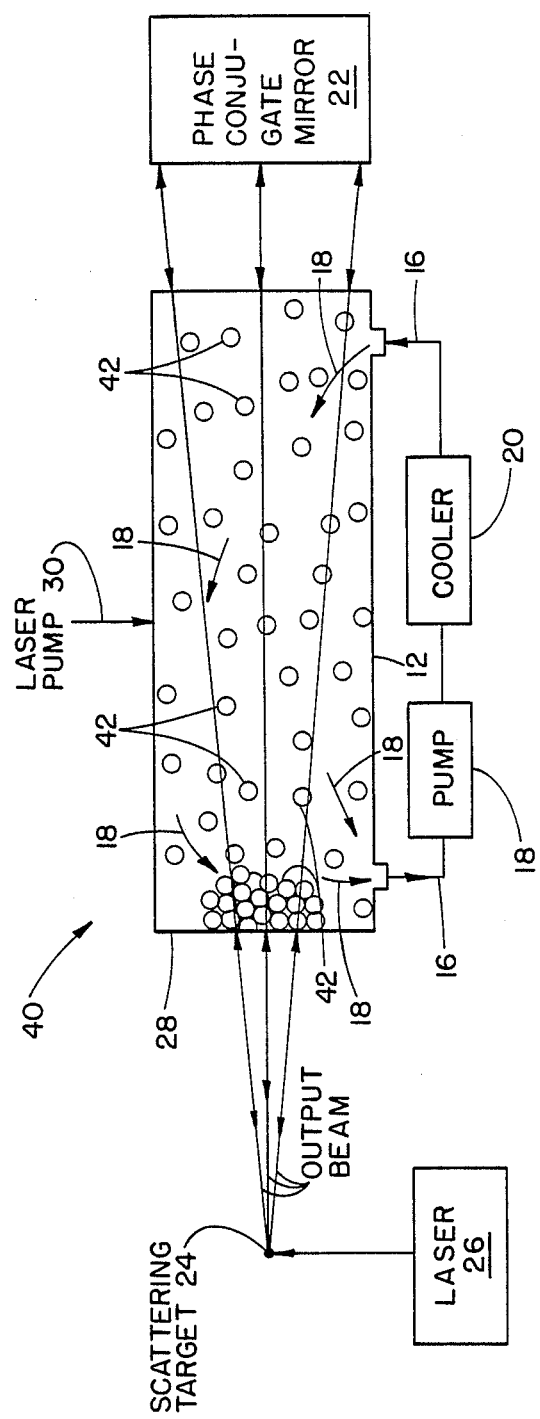
FIG. 2 illustrates a second exemplary embodiment of the present invention wherein the glass beads are spheres to maximize the ratio of the exterior area to volume of each bead, to provide for efficient cooling thereof.

FIG. 2 illustrates a second embodiment 40 of the present invention similar in many respects to the embodiment of FIG. 1, but wherein the individual lasing elements are selected to be only spheres 42 to maximize the effective cooling thereof. For a given glass material, one very important approach to solving the cooling problem relies on maximizing the ratio of the external area to volume of the shape of the active medium. The introduction of slabs to replace rods is one example of this concept to increase the duty cycle of glass lasers. The use of glass spheres for the active lasing medium maximizes the ratio of the external area to volume for the lasing element. However, an active medium of glass spheres would have relatively poor transmission due to scattering. The mismatch in index of refraction between the glass spheres and the surrounding medium would cause a reflection at each interface. However, the scattering problem can be significantly reduced by the use of an index matching coolant fluid 16. The coolant fluid is circulated through the laser cavity to provide for the necessary cooling. However, the index matching fluid would generally result in poor optical beam quality for the laser. Index matching fluids generally have temperature dependent indices of refraction, and a large laser medium should ideally be homogeneous in temperature.

Accordingly, the phase conjugate mirror 22 is utilized to minimize all of the foregoing optical distortions.

A glass laser amplifier constructed pursuant to the teachings of the present invention has several advantages over other types of glass laser amplifiers, with higher average output powers. The laser amplifier could be easily mass produced and made very large because large high quality regularly shaped slabs of glass do not have to be manufactured. The phase conjugate mirrors would also relax the optical quality of the other components of the laser amplifier.

One preferred application of the present invention is for Nd glass lasers, wherein the doped glass lasing elements are doped with Neodymium to lase at a wavelength of approximately 1.06 microns in the near infrared portion of the spectrum. It is contemplated that the glass lasing elements would be relatively small with approximately 1 millimeter cube volumes and be of varying shapes and sizes, which would significantly reduce the manufacturing and fabrication problems associated therewith.

The embodiments of FIGS. 1 and 2 operate on spherically expanding wavefronts emanating from the target.

In alternative embodiments, a collimated wavefront could be introduced into the laser amplifier cavity.

Figure 3:
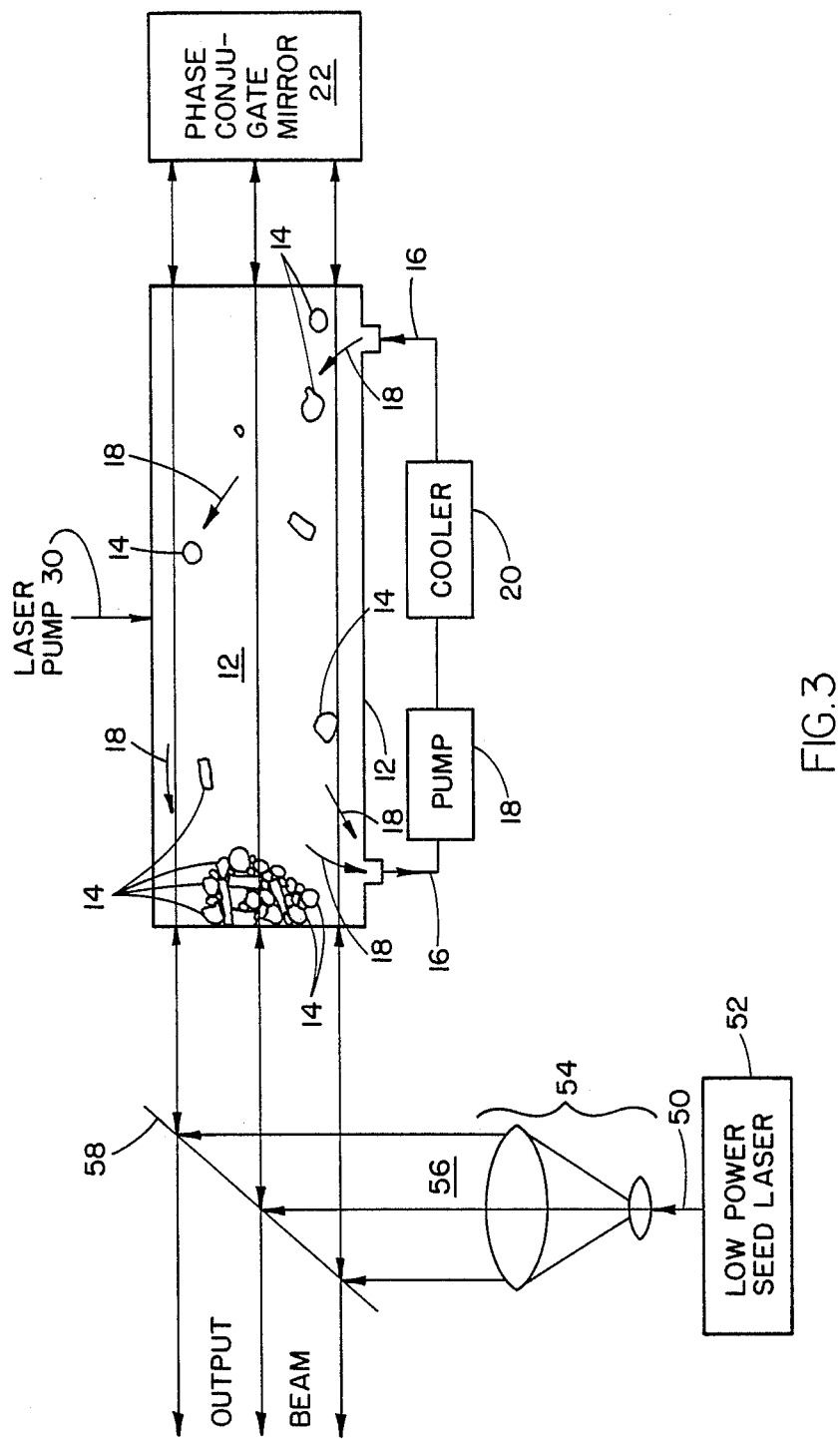
FIG. 3 is a schematic drawing of a third exemplary embodiment of the present invention which provides a collimated output laser light beam.

FIG. 3 illustrates a third embodiment of the invention, similar in some respects to the embodiment of FIG. 1, but wherein the output of the laser amplifier is a collimated output beam. In this embodiment, a lower power seed laser beam 50 is generated by a seed laser 52. The beam 50 is expanded and collimated in a telescopic optical system 54, and the expanded collimated beam 56 is directed against a beam splitter 58, which reflects a portion thereof into the glass laser amplifier cavity 12, which is the same general type and numbered identically with the embodiment of FIG. 1. The input collimated beam passes through the laser amplifier cavity 12, is reflected by the phase conjugate mirror 22, and then passes back through the laser amplifier cavity and passes through the beam splitter 58 to form a collimated output beam 60.

While several embodiments and variations of the present invention for a glass bead laser amplifier with a phase conjugate mirror have been described in detail herein, it should be apparent that the disclosure and teachings of the present invention will suggest many alternative designs to those skilled in the art.

What is claimed is:

1. A glass laser amplifier, comprising:
   a. a laser amplifier cavity having a plurality of adjacent and contiguous doped glass lasing elements therein in contiguous actual contact with and physically touching each other, with the shape of each glass element providing a relatively large ratio of the external area to volume of the glass lasing element, to provide for efficient cooling thereof;
   b. a cooling system for said laser amplifier cavity, including a coolant fluid circulating through said laser cavity around and between the contiguous and physically touching glass lasing elements for cooling thereof, said cooling fluid having an index of refraction substantially matching that of the glass lasing elements to substantially reduce scattering of light passing through glass/cooling fluid interfaces in the laser amplifier cavity; and
   c. a conjugate mirror positioned adjacent said laser amplifier cavity for reflecting the laser light passing through the laser amplifier cavity back through the laser amplifier cavity to cancel the initial optical distortions introduced into the laser beam as it initially passed through the laser amplifier cavity and the glass/cooling fluid interfaces therein, to produce an output laser beam substantially unaffected by the initial optical distortions therein.

2. A glass laser amplifier as claimed in claim 1, said doped glass lasing elements being relatively small to provide for efficient cooling thereof, and being of varying sizes and shapes packed contiguously into the gas laser amplifier cavity.

3. A glass laser amplifier as claimed in claim 2, said glass lasing elements being relatively small with approximately 1 millimeter cube volumes or less.

4. A glass laser amplifier as claimed in claim 3, said glass lasing elements being packed contiguously into said laser amplifier cavity to substantially fill the entire laser amplifier cavity with glass lasing elements.

5. A glass laser amplifier as claimed in claim 4, said doped glass lasing elements being doped with Neodymium to lase at a wavelength of approximately 1.06 microns in the near infrared portion of the spectrum.

6. A glass laser amplifier as claimed in claim 1, said glass lasing elements having a substantially spherical external shape, to maximize the ratio of the external area to volume of each element.

7. A glass laser amplifier as claimed in claim 6, said doped glass lasing elements being doped with Neodymium to lase at a wavelength of approximately 1.06 microns in the near infrared portion of the spectrum.

8. A glass laser amplifier as claimed in claim 1, further including an optical arrangement associated with said laser amplifier cavity for producing a collimated output laser beam.

9. A glass laser amplifier as claimed in claim 1, further including an optical arrangement associated with said laser amplifier cavity for producing a converging output laser beam.

* * * * *